(12) United States Patent
Davis (10) Patent No.: US 8,073,865 B2
(45) Date of Patent: Dec. 6, 2011

(54) SYSTEM AND METHOD FOR CONTENT EXTRACTION FROM UNSTRUCTURED SOURCES

(75) Inventor: Jason Davis, New York, NY (US)

(73) Assignee: Etsy, Inc., New York, NY (US)

( * ) Notice: Subject to any disclaimer, the term of this patent is extended or adjusted under 35 U.S.C. 154(b) by 297 days.

(21) Appl. No.: 12/558,940

(22) Filed: Sep. 14, 2009

(65) Prior Publication Data

US 2011/0066662 A1    Mar. 17, 2011

(51) Int. Cl.
*G06F 17/30* (2006.01)
(52) U.S. Cl. ......... 707/769; 707/707; 707/723; 707/759
(58) Field of Classification Search .................. 707/707, 707/723, 759, 769; 709/217, 219
See application file for complete search history.

(56) References Cited

U.S. PATENT DOCUMENTS

| | | | |
|---|---|---|---|
| 7,039,871 B2 * | 5/2006 | Cronk | 715/741 |
| 7,093,194 B2 * | 8/2006 | Nelson | 715/234 |
| 7,873,680 B2 * | 1/2011 | Meadows | 707/811 |
| 2001/0037490 A1 * | 11/2001 | Chiang | 717/2 |

* cited by examiner

*Primary Examiner* — Shahid Alam
(74) *Attorney, Agent, or Firm* — Patricia M. Mathers (57) ABSTRACT

A system and method for extracting content from unstructured sources is disclosed. The method includes analyzing web pages of a website, storing text and image data for each web page of the website, extracting a plurality of entities from the web page data, scoring each entity of the plurality of entities to provide an overall score for each entity, and defining a product based on the plurality of entities and the overall score for each entity.

16 Claims, 6 Drawing Sheets

| Entity Location (Structural Node) | Entity Type | Entity Value | Quality Score | Position Discount Factor (D=0.8) | Location Score | Aggregate Quality Score Weights=(1,0.5) |
|---|---|---|---|---|---|---|
| <title> | Title | Toaster Oven | High (1.0) | None (1.0) | High (1.0) | $1.0*1.0^{0.5}=1.0$ |
| <div class="img-center"> | Image | (toaster image) | High (1.0) | None (1.0) | High (1.0) | $1.0*1.0^{0.5}=1.0$ |
| <div class="related"> | Image | (iron image) | Low (0.14) | Medium (0.8) | Low (0.1) | $0.080*.1^{0.5}=.026$ |
| <div class="main"> | Description | Toaster oven descr | High (1.0) | None (1.0) | High (1.0) | $1.0*1.0^{0.5}=1.0$ |
| <div class="promo"> | Description | Free shipping. | High (1.0) | Small (0.8) | Med (0.8) | $0.8*0.8^{0.5}=0.72$ |
| <div class="p1"> | Price | $54.99 | Med (0.7) | None (1.0) | Med (0.4) | $1.0*0.4^{0.5}=0.44$ |
| <div class="p2"> | Price | $5 | Low (0.1) | None (1.0) | Med (0.4) | $1.0*0.4^{0.5}=0.44$ |
| <div class="p3"> | Price | $49.99 (sale price) | High (1.0) | None (1.0) | High (1.0) | $1.0*0.4^{0.5}=0.44$ |

| Image | Distinctiveness Score | Size Score | Foreground/Background Score | Aggregate Image Score |
|---|---|---|---|---|
| (toaster) | High (1.0) | High (1.0) | High (1.0) | 1 |
| (iron) | Med (0.7) | Low (0.2) | High (1.0) | 0.14 |

SYSTEM AND METHOD FOR CONTENT EXTRACTION FROM UNSTRUCTURED SOURCES

BACKGROUND INFORMATION

1. Field of the Invention

The invention relates generally to databases. More particularly, the present invention relates to a system and method for extracting content from unstructured sources.

2. Description of the Prior Art

Solutions are known to extract content from unstructured sources such as content from web pages on websites. Accordingly, such methods have the objective of collecting data from websites by parsing web pages with the intent to use the data for other applications.

The problem with traditional solutions for extracting unstructured content from web pages on a website is the inability to accurately extract specific entities amongst all the unstructured data found on a web page. Another problem with traditional solutions for extracting unstructured content from web pages on a website is the inability to effectively identify and remove poor data collected through the parsing process. A still further problem with traditional solutions for extracting unstructured content from web pages is the inability to automatically determine the location of specific entities based on their position within a website.

BRIEF SUMMARY OF THE INVENTION

The invention is a system and method for extracting content from unstructured sources. An objective of the present invention is to accurately extract entities amongst all the unstructured data found on a web page. A further objective of the present invention is to effectively identify and remove poor data collected through the parsing process. A yet further objective of the present invention is to efficiently determine the location of specific entities based on their position with a website.

The present disclosure is directed to implementations of a method and system for generating and/or populating a database. More specifically, the present invention is directed to parsing product data and information from one or more pages of a website, and generating and/or populating a database based on the product data and information. Although implementations of the present invention will be described in the context of an exemplar page and an exemplar website, it is appreciated that implementations of the present invention are equally applicable to any website and number of web pages.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the embodiments of the invention are shown. This invention should not, however, be construed as limited to the embodiments set forth herein; rather, they are provided so that this disclosure will be complete and will fully convey the scope of the invention to those skilled in the art.

Figure 1:
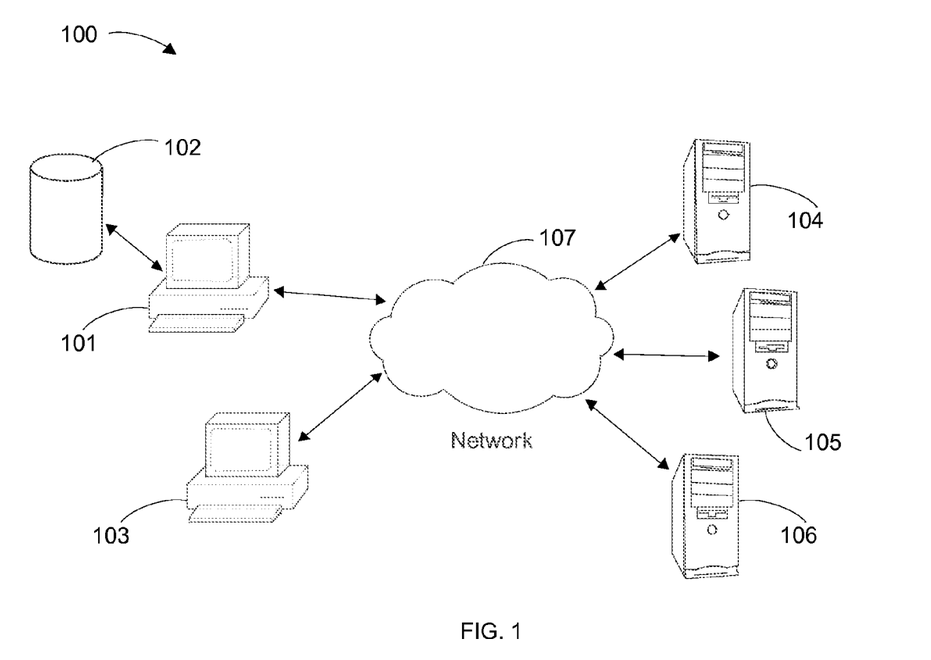
FIG. 1 is a functional block diagram of a system in accordance with an illustrative embodiment of the present invention.

FIG. 1 illustrates an exemplar system 100 of the present invention. The exemplar system 100 includes a parsing computer 101, a database 102, a computer 103, a plurality of servers 104, 105, 106 and a network 107. The parsing computer 101 may generate and/or populate the database 102 based on data retrieved through the network 107, as described in further detail herein. Although the database 102 is illustrated external to the parsing computer 101, it is contemplated that the database 102 may be an integral component of the parsing computer 101, e.g., may be stored in memory of the parsing computer 101, and/or may be resident in a separate memory, or an electronic storage medium, e.g., a server, that communicates with the parsing computer 101. The parsing computer 101 may communicate with the computer 103 and/or one or more of the servers 104, 105, 106 through the network 107. The network 107 may include, but is not limited to, a local area network (LAN), a wide area network (WAN), a wireless LAN (WLAN), a metropolitan area network (MAN), a personal area network (PAN), the Internet, and/or combinations thereof.

The computer 103 and/or servers 104, 105, 106 may each host one or more websites, which may be accessed over the network 107. For example, a user of the parsing computer 101, and/or the computer 103 may access a website that is hosted on one of the servers 104, 105, 106, pages of which website are displayed on a display. Many websites offer products and services to potential customers via a network 107, such as the Internet. Consequently, a user of the computer 103, for example, may access a website, review the products and/or services of the proprietor of the particular website, and may electronically purchase such goods and/or services.

In implementations of the present invention, the parsing computer 101 may execute processes for parsing, aggregating and processing product data from any number of websites, and generating and/or populating the database 102 based on such product data. More specifically, and as described in further detail herein, the product parsing computer 101 reviews or analyzes web pages of any number of websites, records product data relating to products and/or services offered by a particular website, and generates a product list based on the product data. In some implementations, the parsing computer 101 may function as a proxy server, which acts as an intermediary for requests from clients, e.g., the computer 103, seeking resources from other servers, e.g., the computer 103, and/or one or more of the servers 104, 105, 106.

Figure 2:
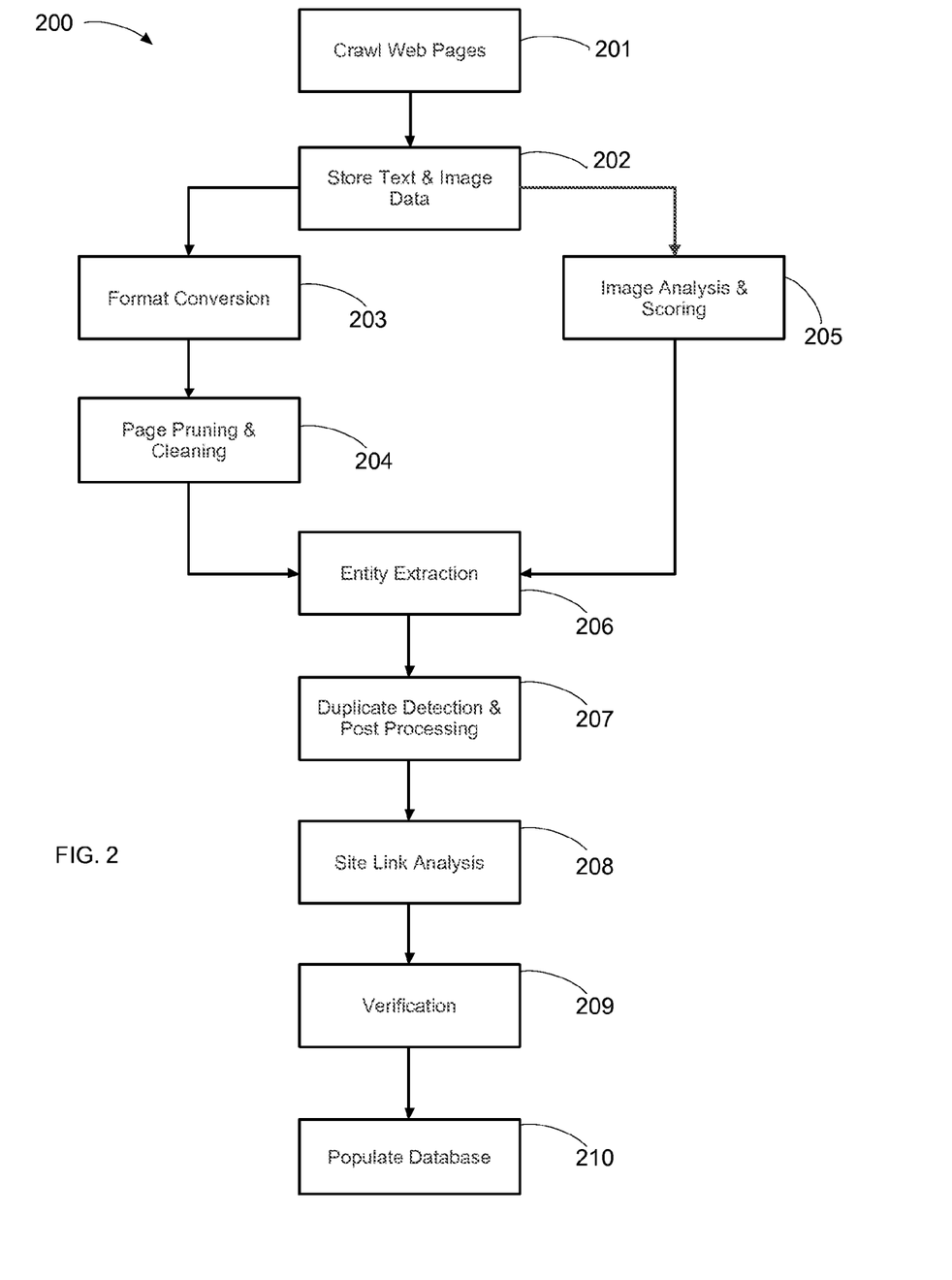
FIG. 2 is a flow diagram illustrating the steps that may be executed in a method in accordance with an illustrative embodiment of the present invention.

FIG. 2 illustrates the steps that may be executed in a method 200 in accordance with an illustrative embodiment of the present invention. In step 201, web pages of one or more websites are crawled, or analyzed. In step 202, text and image data from the web pages are used to generate a standard document object model (SDOM) and are stored in computer memory. A document object model (DOM) is a W3C (World Wide Web Consortium) specification for application program interfaces for accessing the content of HTML and XML documents. In a DOM, documents are represented by a logical structure that is very much like a tree. Documents are modeled using objects and the model encompasses not only the structure of a document but also the behavior of a document and the objects of which it is composed. The tree structure of the DOM contains nodes that represent objects in the document with functions and identity. Standard document object model (SDOM) refers to the version of a DOM that is based on the W3C specification. In step 203, a format conversion is executed on the SDOM resulting in a modified document object model (MDOM), e.g. a modified version of the SDOM. After the format conversion, page pruning and cleaning are performed 204, resulting in an aggregated document object model (ADOM). The ADOM is a further modified version of the SDOM that is configured for processing steps of the present invention. The page pruning step comprises removing nodes from the MDOM and the cleaning step comprises removing web page data not necessary for the ADOM. Image analysis and scoring are executed 205. This step comprises analyzing the image data obtained in step 202 and assigning a score to each image. Although steps 203 and 205 are illustrated as being concurrently executed in the implementation illustrated in FIG. 2, it is appreciated that steps 203 and 205 may occur in any order desired.

Product entities are extracted 206 as product data from the ADOM, and one or more product lists are generated based on the extracted product entities. Next, duplicate detection and post-processing are executed 207 to remove any redundant, and/or conflicting product data within the product list(s). Site link analysis is then performed 208 that analyzes the location of products on the website and adjusts the product score based on this information. The site link analysis step 209 is followed by a verification step 209. A database is populated 210 based on the products and product information provided in the cleaned and verified product list(s).

Figure 3:
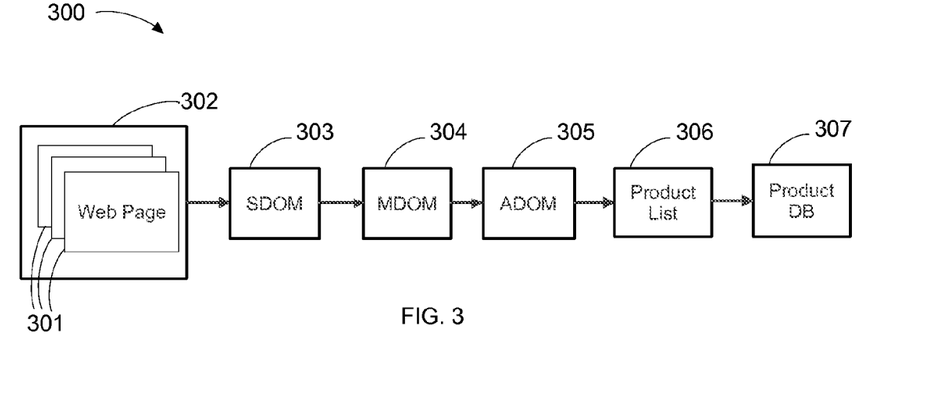
FIG. 3 is a block diagram illustrating a process in accordance with an illustrative embodiment of the present invention.

FIG. 3 illustrates a process 300 in accordance with an illustrative embodiment of the present invention. The process 300 includes crawling, or analyzing a web page, or pages 301 of a website 302, generating an SDOM 303 based on product data retrieved from the web page(s) 301, converting the SDOM 303 to a MDOM 304 based thereon, converting the MDOM 304 to an ADOM 305 based thereon, and generating a product list 306 for the particular website 302 based on the ADOM 305. The product list 306 may be used to generate and/or populate a product database 307.

Figure 4:
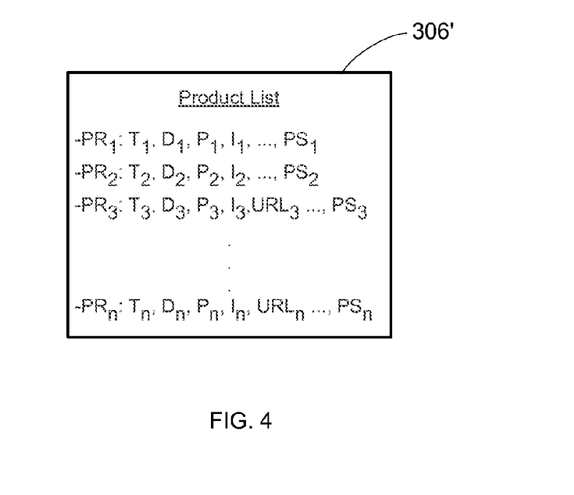
FIG. 4 is an illustration of a product list in accordance with an illustrative embodiment of the present invention.

FIG. 4 is a schematic illustration of a generic product list 306'. The product list 306' is generated for a particular website and provides an inventory of each of the products and/or services, e.g., $PR_1$ to $PR_n$, that are available on the website 302, at the time the particulate website 302 is analyzed. Each product in the inventory is associated with product data. The product data may include but are not limited to, a title ($T_n$), a description ($D_n$), a price ($P_n$), an image ($I_n$), and/or an overall product score ($PS_n$). Other product data may include but are not limited to a uniform resource locator (URL) that provides a link back to the particular web page 301 on which the product was presented, and/or DOM information.

Method steps of embodiments of the present invention may include, but are not limited to, crawling web pages, format conversion, pruning and cleaning of web page data, image analysis and scoring, product data extraction and scoring, duplicate detection and post-processing, website link analysis, verification, and product database generation and/or population. Implementations of each of these method steps will be described in further detail below.

Figure 6:
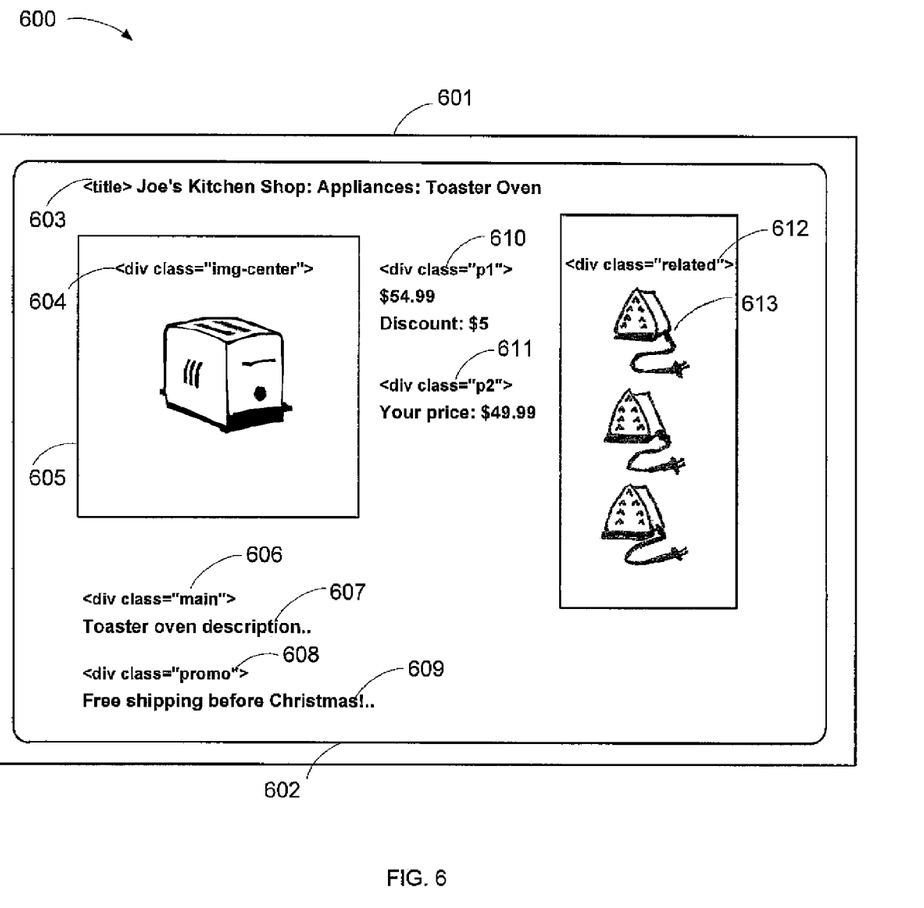
FIG. 6 is a schematic illustration of a screen-shot of a website page in accordance with an illustrative embodiment of the present invention.
Figure 7:
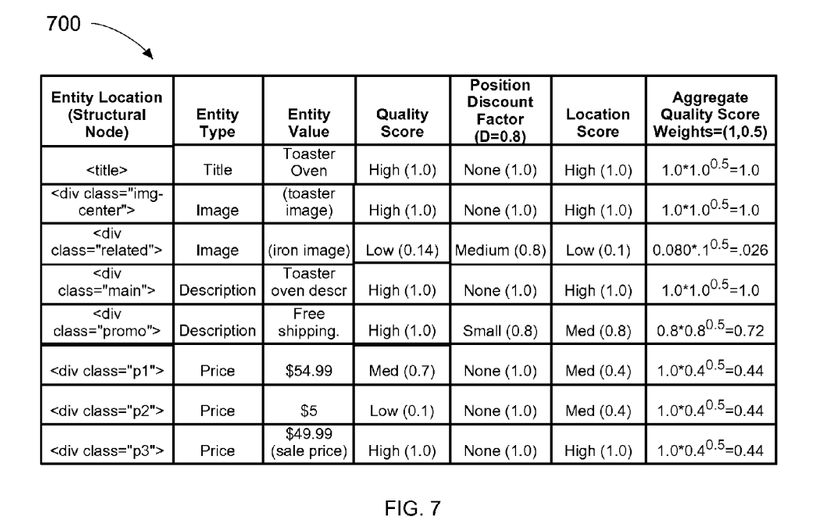
FIG. 7 is an entity table that may be generated based on the website page of FIG. 6 in accordance with an illustrative embodiment of the present invention.
Figure 8:
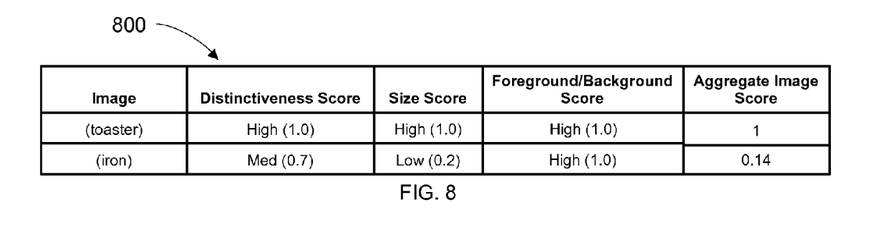
FIG. 8 is an image table that may be generated based on the website page of FIG. 6 in accordance with an illustrative embodiment of the present invention.

FIGS. 6-8 illustrate embodiments of the present invention in the context of a sample website for the retailer "Joe's Kitchen Shop" and a sample web page 602 for the product "Toaster Oven." FIG. 6 is a schematic illustration of a screenshot 601 of a website page 602 in accordance with an illustrative embodiment of the present invention and shows the actual text and images as they appear to a user viewing the web page 602 on the display of a computer 103. FIG. 6 also illustrates underlying hypertext mark-up language (HTML) tags, e.g. <title> 603, which tags underlie the particular web page 602 and are not immediately viewable to a user viewing the web page 602.

The following describes the application of the method of the present invention as it applies to the sample website for the retailer "Joe's Kitchen Shop", with reference to FIGS. 1-3. Initially, web pages 301 of a website 302 are crawled 201, e.g. captured and downloaded, and the code underlying each web page 301 is stored to memory 202. In the embodiment of FIG. 1, the parsing computer 101 performs the website crawling function and the underlying web page code is stored into memory resident on the parsing computer 101. The underlying code may include any code that is used to generate the particular web page 602. The underlying code includes, but is not limited to HTML. HTML may be used to describe the structure of text-based information in a web page 602. For example, HTML may be used to denote certain text as links, headings, paragraphs, and/or lists. HTML may also be used to supplement the text with interactive forms, embedded images and other objects. In general, HTML is provided as tags surrounded by angle brackets and may be used to describe the appearance and/or semantics of a web page 602 and may include embedded scripting language code, e.g., JavaScript. Although embodiments of the present invention will be described in the context of HTML, it is appreciated that such embodiments are equally applicable to any code and/or combinations of code that may be used to generate a web page 602.

Once the raw HTML code for each web page has been stored to memory 202, the code undergoes a format conversion 203 to generate the SDOM 303. More specifically, the raw HTML code is parsed into the SDOM, which may be provided as a DOM that is in a format common to standard website browser programs, e.g., a W3C compliant DOM. The SDOM 303 represents HTML-based web pages in a tree format, with the <html> tag provided as the root of the tree. The SDOM 303 is processed to generate or construct the MDOM 304.

Figure 5:
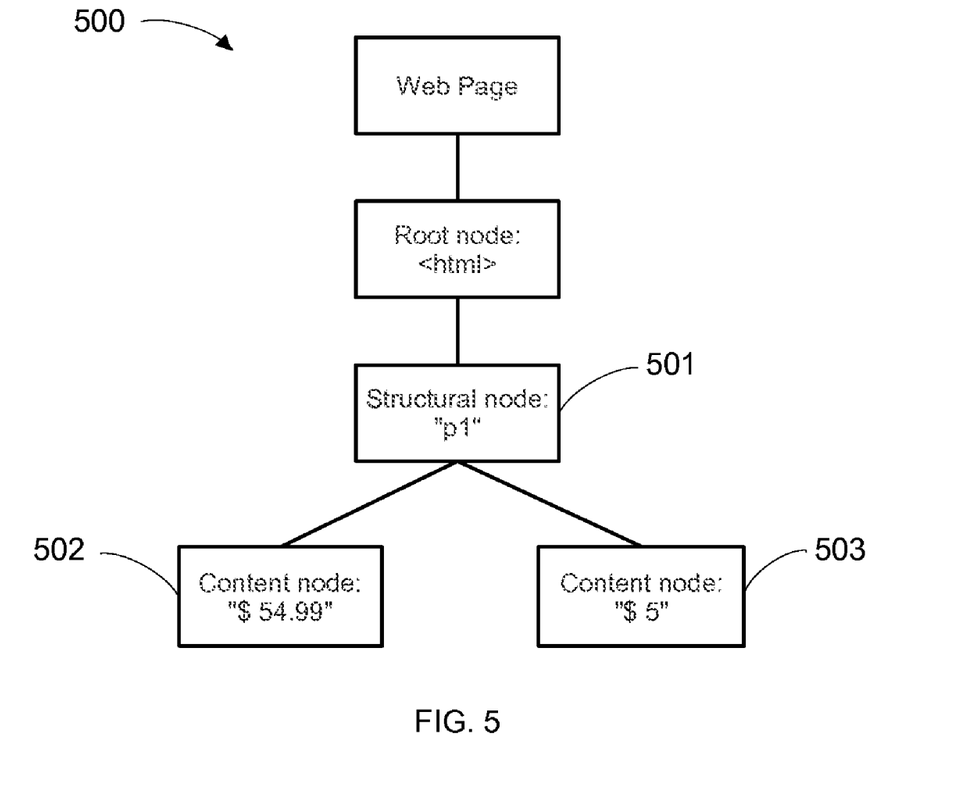
FIG. 5 is a block diagram illustrating the format of the modified document object model (MDOM) in accordance with an illustrative embodiment of the present invention.

The format of the MDOM 304 differs from the format of the SDOM 303 by including structural nodes and content nodes. FIG. 5 illustrates the format of the MDOM 500. The structural nodes 501 define locations on the HTML-based web page, e.g., top, bottom, right, left, center. Available HTML tags within the web page define locations. For example, the HTML tag:

<div class="text-red" style="align:right">
defines red text on the right side of the web page. A structural node is represented by the text of the tags it represents.

The content nodes 502, 503 include contiguous segments of text data that are located on the particular web page. Unlike the SDOM 303 in which each HTML tag corresponds to an individual node, the content nodes 502, 503 of the MDOM 500 may correspond to multiple HTML tags that are close to one another within a web page. For example, the HTML tag:
<p>Company <b>product</b> parser.</p>
is represented by two nodes under the SDOM 303 model, e.g., one node corresponding to the paragraph tag and another node corresponding to the bold tag. In contrast, the content nodes 502, 503 of the MDOM 500 condense these nodes into a single block of text. More specifically, combining contiguous formats of text generates content nodes. Tags associated with such text may include, but are not limited to: bold, italics, paragraph, line break, and hyper-link. Content nodes are also used to represent images.

For non-HTML domains, the MDOM 500 may be constructed from any product layout format. For example, typesetting systems, such as TeX, or extensible markup language (XML) based document standards, specify page layouts using a similar tagging system. In such domains structural nodes are represented by tags corresponding to their respective languages and/or specifications.

The location of each content node 502, 503 in the MDOM 500 is defined. By way of one non-limiting example, a location of a content node "X" is defined as the node's structural parent node. A location score for each content node is provided, as discussed in further detail below, and may be conditioned based on specific content node properties. For example, the location score of content node "$5" 503, among nodes with a specific property of "p1" 501, is defined by the content nodes with property "p1" 501 appearing above "$5" 503 in the original web page, e.g., content node "$54.99" 502.

Pruning and cleaning 204 the web page data includes cleaning particular web page data and pruning particular nodes of the MDOM. The pruning and cleaning results in the ADOM 305. In one embodiment of the present invention, an example of a cleaning step analyses HTML titles across each of the web pages 301 to remove redundant verbiage. For example, the web pages of many retail websites and/or online catalogs are initially provided as templates. By way of one non-limiting example, a website may include an HTML title that includes a company name, a product category, and a particular product name, e.g., "Joe's Kitchen Shop: Appliances: Toaster Oven" 603. The goal of the title cleaning, in this instance, is to strip out the company name, e.g., "Joe's Kitchen Shop" and the product category, e.g., "Appliances", and to retain only the product name, e.g., "Toaster oven", within the resultant ADOM 305. Implementations of the cleaning step may include splitting titles into sub-phrases based on the presence of particular characters including, but not limited to: hyphen (-), colon (:) and/or comma (,). Sub-phrases may be counted across all web pages 301 and over-represented phrases or duplicate phrases are identified. Such identification may be achieved using an entropy-based measure of variance. The over-represented phrases are stripped out of the web pages 301 in a subsequent pass through when generating the ADOM 305.

Using the above non-limiting example, a cleaning step of an embodiment of the present invention will be described. Initially, the title "Joe's Kitchen Shop: Appliances: Toaster Oven" 603 is split into sub-phrases based on the presence of the colons (:) which may include: "Joe's Kitchen Shop," "Appliances," and "Toaster oven." Each sub-phrase may be counted across each of the web pages 301 of the particular website 302, particularly if the website 302 is owned and operated by the retailer Joe's Kitchen Shop. Consequently, the entropy-based measure of variance would be low, e.g., the presence of this specific sub-phrase rarely varies from web page to web page.

The sub-phrase "Appliances" is likely present on a first sub-set of web pages 301 of the website 302. For example, the retailer Joe's Kitchen Shop offers any number of categories of products, with appliances being only one example of such a product category. Consequently, the entropy-based measure of variance is medium because the sub-phrase "Appliances" is present on all web pages 301 corresponding to that particular product category, e.g., the presence of this particular sub-phrase somewhat varies from web page to web page. The sub-phrase "Toaster Oven" is present on a second sub-set of web pages 301 that includes a fewer number of web pages 301 than the first sub-set. For example, the phrase "Toaster Oven" may be indicative of a specific product within the "Appliances" product category. Consequently, the sub-phrase "Toaster Oven" may only be present on a single web page 301 or just a small number of web pages 301 associated with that specific product, and the entropy-based measure of variance would be high, e.g., the presence of this particular sub-phrase often varies from web page to web page.

Title sub-phrases that are assigned low and medium entropy-based measures of variance are stripped from the product data when generating the ADOM 305 and are therefore not present in the ADOM 305. In this manner, title sub-phrases that are unrelated to a specific product are removed. For example, sub-phrases identifying the website proprietor and/or sub-phrases identifying a product category do not identify or otherwise correspond to a specific product. Title sub-phrases that are assigned a high entropy-based measure of variance remain and are present in the ADOM 305. In this manner, title sub-phrases that have a high likelihood of identifying a specific product remain.

In a pruning step of an embodiment of the present invention, nodes that are deemed to be artifacts of a page template and contain no product-specific information are removed and are not present in the ADOM 305. Artifacts may include, but are not limited to: a logo of the retailer, a search box, web pages footers, and/or web page headers. The pruning step works by repeatedly removing "leaf" nodes from the tree. Leaf nodes are nodes in the ADOM 305 which have no children nodes. The pruning step works by computing the frequency of each leaf node in the MDOM 304 across each of the web pages 301. That is to say, how often a particular leaf node appears across the web pages 301 is determined. Leaf nodes having a relatively high frequency are pruned. This step is repeated until all high frequency leaf nodes are removed. In some implementations, the determined frequency of a particular leaf node is compared to a threshold frequency. If the leaf node frequency exceeds the threshold frequency, that particular leaf node is deleted. A frequency threshold may include, but is not limited to the value of 25%. In such an instance, a leaf node that appears in more than 25% of the web pages 301 is removed and not included in the ADOM 305.

Once the ADOM 305 has been generated based on the pruning and cleaning 204, particular product data or entities are extracted 206 from the ADOM. Referring to FIG. 6, entities are properties that define a particular product and may include, but are not limited to: a product title 603, a product description 607, a product image 605, and a product price 610, 611. Title 603, description 607 and image 605 are entities that have a one-to-one correspondence to the remaining content nodes of the ADOM 305. Price entities 610, 611 may correspond many-to-one. For example, a single block of text may contain multiple prices 610.

As each entity is extracted from the ADOM 305, an aggregate quality score is determined for each entity as discussed in further detail below. An aggregate quality score may range from 0 to 1, for example, and is based on a product quality score and a location score. The product quality score is based on a plurality of scores, where each score corresponds to a particular entity. The value of each of the scores is specific to each entity type. For example, a longer description will have a higher quality score than a shorter description. A position discount may be applied to increase or decrease an entity's aggregate score. For example, entities appearing lower in a web page 602 are more heavily discounted than entities appearing higher in the web page 602. A location score is based on the location of the particular entity with respect to the context of the entity's structural node. Location scores may be inferred by analyzing the quality scores of entities for other web pages at the same location.

FIG. 7 illustrates a sample table 700 of extracted entities and properties, based on the sample web page 602 of FIG. 6. The entity extraction step 206 determines product properties by aggregating scores and selecting product properties based on highest-scoring entities. The extraction and scoring step is described in further detail below.

The entity quality scores are relatively simple heuristics specific to each of the relevant product properties or entities. As mentioned above with respect to title quality, entities including relatively short spans of text, e.g., less than 100 characters, but greater than 20 characters, are assigned higher quality scores. In contradistinction, and with regard to description quality, entities with more text are assigned higher quality scores.

Quality scores for price entities may present a special case. Initially, prices may be required to meet pre-defined criteria. For example, prices may be bounded within a range defined between a lower price threshold, e.g., 0, and an upper price threshold, e.g., 10,000. In a web page 602, prices 610, 611 may appear in several contexts. These contexts include, but are not limited to: price triples, price doubles, and singleton prices. Singleton prices are prices that appear alone and may be assigned a moderate quality score.

Price triples may include three consecutive prices. By way of one non-limiting example, a price triple may include:

$$A-B=C$$

where A is the original product price, C is the sales price, and B is a price discount. An example of such a price triple is illustrated in the web page 602 of FIG. 6, where the original product price 610 is provided as $54.99, the price discount is provided as $5, and the sales price 611 is provided as $49.99. In the case of a price triple, the price entity corresponding to price C, the sales price, is assigned the highest quality score of the three prices, e.g., 1.0. Price A, the original product price, is assigned a moderate quality score, e.g., 0.7, and price B, a price discount, is assigned the lowest quality score of the three prices, e.g., 0.1.

By way of a non-limiting example, a price double may be provided as two consecutive prices such that:

$$E<A; \text{ and}$$

$$E>(1-Q)*A$$

where A is the original product price and E is the sale price discounted by Q. In this manner, E is limited by a pre-defined value of Q. By way of a non-limiting example, Q may be equal to 0.50, e.g., 50%. In such an instance, E must be less than A and must be greater than 50% of A to be deemed a valid price entity. In the case of a price double, E is awarded a high quality score, e.g., 0.9, and A is awarded a moderate quality score, e.g., 0.7.

The price contexts described herein are not exhaustive and not mutually exclusive. For example, a singleton price may occur as a part of a price triple. In implementations of the present invention, prices are identified in accordance with the following order: price triples are preferred over price doubles, and price doubles are preferred over singleton prices. More specifically, each price is included in only one of a price triple, double, or single.

The position discount is determined based on the position of the content node within a particular web page 602. For example, entities corresponding to content nodes with a lower position on a web page 602 are discounted more severely than those having a higher position on the web page 602. Each entity type is assigned a position discount factor (PDF), which is based on a discount value (D), and may range, for example, between 0 and 1. In one embodiment of the present invention, entity discounting for the $k^{th}$ entry of a given product entity is computed as $D^{k-1}$. For example, the PDF for the first entry of a particular entity is $D^{1-1}$, which provides a PDF equal to 1. Prices appearing in groups, e.g., doubles or triples) are assigned the same discount equal to the discount of the first price. The entity table of FIG. 7 provides an example of a discount value of 0.8 (D=0.8) for all of the entities in the table. It is appreciated, however, that the discount value may vary, and may be different from entity to entity. For example, the PDF for the title entity may be determined using a higher discount value relative to the discount factor of another entity, such that titles that are identified lower on a web page 602 may be more heavily discounted. In the entity table of FIG. 7, the PDF for the title entity is calculated as:

$$PDF_{TITLE}=0.8^{(1-1)}=1.$$

The PDF for the toaster image is calculated as:

$$PDF_{TOASTERIMG}=0.8^{(1-1)}=1$$

where k equals 1 for both the title entity and toaster image entity because this is the first entry for these product entities. The PDF for the iron image 613 is calculated as:

$$PDF_{IRONIMG}=0.8^{(2-1)}=0.8$$

where k=2 because this is the second entry for this product entity.

Once all product entity quality scores and PDFs have been computed for all web pages 602 across all relevant product properties, entity location scores are determined. Location scores are determined independently for each product entity. In one embodiment of the present invention, each location score is determined based on the following steps:

1. The location of each product entity is defined as the parent node of its corresponding content node. As noted above, the parent node of any content node is a structural node.
2. All such locations, i.e., structural nodes, are aggregated together based on their unique location identifier, as described above. Aggregate scores for each location are each computed as the average of the quality scores of the corresponding entities.
3. Each entity is assigned its location score based on this aggregate score.

For example, the entity value "$54.99" has a location score of 0.4. The parent node, i.e. structural node, associated with this entity value is <div class="p1">, which is also the parent node for entity value "$5". The average quality score is calculated by averaging the quality scores for both entity values with the result of 0.4. In some embodiments of the present invention, the location score may be determined based on the average quality score among other documents within the same product catalog, e.g., website, of the same location.

The aggregate scores are computed for each entity based on the quality score, the position discount factor, and the location score. By way of one non-limiting example, the aggregate score is calculated by taking a weighted multiplicative average between a particular entity's location score and discounted quality scores. For example, each aggregate score may be calculated based on:

$$AS=(QS*PDF)^x*(LS)^y$$

where AS is the aggregate score, QS is the quality score, PDF is the position discount factor, LS is the location score, and x and y are weighting factors. The values of x and y may lie in a range between 0 and 1. By way of one non-limiting example, x is equal to 1 and y is equal to 0.5. In this manner, the quality score, as discounted based on the position discount factor, is weighted more heavily than the location score.

Using the values provided in the entity table of FIG. 7, a select sample of aggregate score calculations will be described. The weighting factor x has been provided a value of 1.0, and the weighting factor y has been provided a value of 0.5, in this example. With regard to the title entity with the entity value of "Toaster Oven," a quality score of 1.0 is provided, a position discount factor of 1.0, i.e., no discount, is provided, and a location score of 1.0 is provided. Consequently, the aggregate score is determined as:

$$AS_{TITLE}=(1.0*1.0)^{1.0}*(1.0)^{0.5}=1.0$$

With regard to the image entity with the entity value of "iron image," a quality score of 0.14 is provided, a position discount factor of 0.8, e.g., medium discount, is provided, and a location score of 0.1 is provided. As noted above, using a discount value of 0.8, the PDF for this particular entity is calculated as $0.8^{(2-1)}$, or 0.8. The aggregate score is determined as:

$$AS_{IRONIMAGE}=(0.14*0.8)^{1.0}*(0.1)^{0.5}=0.026$$

With regard to the description entity with the entity value of "Free shipping . . . ," a quality score of 1.0 is provided, a position discount factor of 0.8, e.g., small discount, is provided, and a location score of 0.8 is provided. As noted above, using a discount value of 0.8, the PDF for this particular entity is calculated as $0.8^{(2-1)}$, or 0.8. The aggregate score is determined as:

$$AS_{DESCRIPTION}=(1.0*0.8)^{1.0}*(0.8)^{0.5}=0.72.$$

With reference to FIG. 8, a table of images 800 is generated based on the website page of FIG. 6 in accordance with an illustrative embodiment of the present invention. The aggregate image scores are determined based on several scores including, but not limited to, an image size score, a distinctiveness score, and/or foreground/background segmentation score. For example, larger images are assigned a higher score, e.g., 1.0 out of a range from 0 to 1, and smaller images are assigned a lower score, e.g., 0.1 out of a range from 0 to 1. In some embodiments of the present invention, an image that is of a size that is below a predetermined threshold size may be assigned a score of zero.

Images that are more distinctive appear less often throughout the particular website 601 and are therefore assigned higher distinctiveness scores than images that appear more often. This eliminates brands, logos, and/or any other non-product related images that appear throughout the website 601, but do not appear often enough to be pruned away in the pruning step 204. The distinctiveness score for a particular image may be assigned or calculated based on a predetermined formula. In some embodiments of the present invention, a distinctiveness score may be computed based on the following formula:

$$\text{Distinctiveness score}=1/(\log_{10}(X)+1)$$

where X is equal to the number of web pages, on which the particular image appears for the website 601. For example, if the particular image appears on only one web page of the website 601, X is equal to 1. In such case, the image's distinctiveness score is provided as:

$$\text{Distinctiveness score}=1/(\log_{10}(1)+1)=1.$$

If the particular image appears on 100 web pages of the website 601, X is then equal to 100. In such case, the image's distinctiveness score is provided as:

$$\text{Distinctiveness score}=1/(\log_{10}(100)+1)=1/(2+1)=0.33.$$

With regard to foreground/background scores, each image may be segmented in terms of its foreground and background using a statistical region merging (SRM) algorithm. SRM is an image segmentation technique based on region growing and merging. SRM is used to segment the image into foreground and background sections. Images with a well separated foreground are assigned higher scores than images without. This is determined by analyzing the ratio of the size of regions on the border of the image, e.g., the image background, to the size of regions not on the border of the image, e.g., the image foreground.

An aggregate image score (AIS) for a particular image is determined based on each of the distinctiveness score, the image size score and the foreground/background segmentation score. In one illustrative embodiment of the present invention, the aggregate score is provided as a simple multiplication of each of the scores. For example, and with reference to FIG. 8, the aggregate image score for the "toaster" image is: 1.0*1.0*1.0=1.0. The AIS is provided as the quality score for the particular entity. More specifically, the quality score for an image is equal to that image's AIS. As seen in FIGS. 7 and 8, the quality score for the "toaster" image is 0.14, which is the AIS that was determined for the "toaster" image.

Once the ADOM 305 has been created, the ADOM 305 processed, and aggregate scores have been determined, a product list is generated from product data that has been successfully identified as pertinent to particular products. The product data qualifies as successfully identified, if a particular web page includes the entities required to define the product and each of the aggregate scores of the entities is above a predetermined threshold value. In the context of the illustrative embodiment of the present invention, the entities product title, product image, product description, and product price are the entities required to define a particular product.

The product entities are extracted based on the aggregate score (AS) values. In some embodiments, the entity with the highest aggregate score is extracted for the particular product. Using the illustrative embodiment of the present invention of FIGS. 6-8, the parsed product is "Toaster Oven," with the title entity having the entity value "Toaster Oven," the price entity having the entity value "49.99," the image entity having the entity value "toaster image" and the description entity having the entity value "Toaster oven description . . . ," being the extracted entities. For example, of the two description entities that were identified, the description entity having the entity value "Toaster oven description . . . " has the highest aggregate score, and is therefore extracted. Of the three price entities that were identified, the price entity having the entity value "$49.99" has the highest aggregate score, and is therefore extracted.

Each parsed product is saved to the product list 306, and the entities are saved as product data. A final or overall product score (PS) is determined for each particular product and the product score is also saved to the product list 306. In one embodiment of the present invention, the product score is the result of multiplying each of the aggregate scores for each of the extracted entities, provided as:

$$PS = AS_{TITLE} * AS_{PRICE} * AS_{IMAGE} * AS_{DESCRIPTION}$$

In the context of FIGS. 6-8, the overall product quality score for the product "Toaster Oven" may be calculated as:

$$PS_{TOASTEROVEN} = (1.0)*(1.0)*(1.0)*(1.0) = b\ 1.0$$

Upon generating the product list 306, as described herein, the product list 306 may be reviewed for accuracy. More specifically, a duplicate detection and post-processing routine 207 is implemented to remove duplicate product listings. In some embodiments, duplicate product listings are identified based on common titles, and/or common descriptions, or image similarity. In some embodiments, a determination of which duplicate product listing is to be deleted is based on other product data stored in the product list 306. By way of one non-limiting example, URL links of respective, duplicative product listings are compared, whereby the listing having the shortest URL link remains, while the duplicative product listing having a longer URL link is deleted.

The present invention further provides for the implementation of a site link analysis routine 208, once the duplicate detection and post-processing routine 207 is complete. More specifically, in contexts such as the Internet, analyzing linking structure of web pages may play a role in determining product quality. Accordingly, embodiments of the present invention provide for the determination of product link scores. Such link scores may be determined based on factors including, but not limited to, a so-called distance from home, or distance factor, and/or a position factor. The distance factor may be defined as the minimum number of links, or clicks required to arrive at the web page for a particular product starting at the home page of the web site. The position factor may be defined as the number of linked products appearing above a link for a particular product on a web page.

Figure 9:
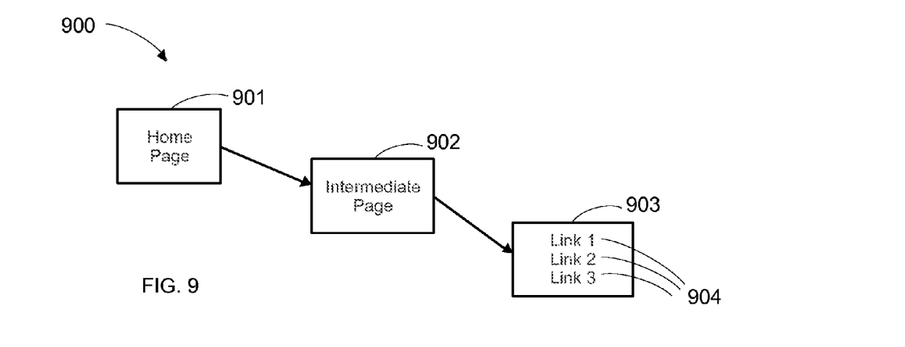
FIG. 9 is a schematic illustration of a portion of a website structure in accordance with an illustrative embodiment of the present invention.

FIG. 9 illustrates a portion of a website structure 900 in accordance with an illustrative embodiment of the present invention and includes a home page 901, an intermediate page 902, and a target page 903. The target page 903 includes a plurality of links 904. An effective link distance is determined plus a MIN value that is based on a plurality of values is determined for each link. The link distance is defined as the distance from a home page 901 of a website 302 to the target page 903, e.g., the number of links, or clicks required to get to a particular product's page from the home page 901. This scoring function ensures that all web pages 301 that are a single link away from the home page 901 have a shorter effective distance than any page that is two or more links away from the home page 901. In some embodiments, the final site link analysis score may be provided as the inverse of the effective site link distance.

In one embodiment of the present invention, the formula for calculating the effective link distance, or link score is provided as:

$$LS = DH + MIN((PP-1)/R, 1)$$

where LS is the link score, DH is the distance from the home page 901, PP is the page position of a particular link, and R is an average number of products that are featured per web page.

For example, the link score for "link 2" of FIG. 9 is calculated as follows:

$$LS = 2 + MIN((2-1)/5, 1) = 2.2$$

where R is set equal to 5. It is appreciated that the value of R will vary on a case-by-case basis depending on the average number of links per page of a given website.

In embodiments of the present invention, the overall product score for a particular product may be determined based on both the product quality score and the link score. More specifically, the overall product score for a particular product may be increased or decreased based on the site link analysis score. In other embodiments of the present invention, such a modification may be achieved by dividing the overall product score with the site link analysis score.

The method according to the invention also provides a verification step 209, which is implemented after generating the product list 306 through the extraction step 206, and/or subsequent modifications to the product list 306 from duplicate detection and post-processing, and site link analysis 208. The verification step 209 may be executed to ensure the accuracy of the product data that is resident on the product list 306. In some embodiments of the present invention the verification step may be executed manually by an operator by comparing a particular product and its associated product data with the web page from which the product data had been extracted 206. In other embodiments, an automated verification step 209 may be executed.

The final product list 306 may serve as a product database 307 or be used to populate and/or generate the product database 210. For example, several product lists may be generated with each product list 306 being specific to a particular retailer. Using the retailers described herein, a first product list 306 for "Joe's Kitchen Shop" may be generated, and a second product list for "Joe's Garden Shop". Each product list 306 may constitute or be stored as its own database 307. Alternatively, or in addition, each product list 306 may be used to generate and/or populate a product database 307, which product database would include products and corresponding product detail for any number of retailers.

The present invention may be implemented in digital electronic circuitry, in computer hardware, firmware, software, or in combinations thereof. The invention may be implemented as a computer program product. A computer program may be written in any form of programming language, including compiled or interpreted languages, and may be deployed in any form, including as a stand-alone program, as a module, component, subroutine, or other unit suitable for use in a computing environment. A computer program may be deployed or be executed on one computer, on multiple computers at one site, or distributed across multiple sites and interconnected by a communication network.

Method steps of the present invention may be performed by one or more programmable processors executing a computer program product to perform functions of the present invention by operating on input data and generating output. Method steps may also be performed by, and an apparatus of the present invention may be implemented as, special purpose logic circuitry, e.g., FPGA (field programmable gate array) or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., EPROM, and flash memory devices; magnetic disks such as internal hard disks and removable disks; magneto-optical disks; and CD-ROM and DVD-ROM disks. The processor and the memory may be supplemented by, or incorporated in special purpose logic circuitry.

The present invention may be implemented in a system including, but not limited to the systems described herein, which include: a back-end component, e.g., a data server) or a middleware component, e.g., an application server) or a front-end component, e.g., a client device having a graphical user interface or a Web browser through which a user may interact with an implementation of the invention), or any combination of such back-end, middleware, or front-end components. The components of the system may be interconnected by any form or medium of digital data communication, e.g., a communication network.

It is understood that the embodiments described herein are merely illustrative of the present invention. Variations in the construction of the present invention may be contemplated by one skilled in the art without limiting the intended scope of the invention herein disclosed and as defined by the following claims.

What is claimed is:

1. A computer-implemented method for extracting content from unstructured sources, the method comprising the steps of:
   a) crawling web pages of a website to extract product data and one or more images associated with the product data, and storing the product data and the images on an electronic storage medium;
   b) parsing the stored product data to generate a standard document object model (SDOM);
   c) converting the SDOM into a modified document object model (MDOM) by adding structural nodes that contain web page location data and content nodes that include contiguous segments of web page text data;
   d) pruning nodes by removing certain nodes from the MDOM by determining leaf nodes that are not associated with a child node in the MDOM and removing those leaf nodes, calculating frequency of occurrence across the web pages of the leaf nodes, and cleaning the MDOM to construct an aggregated document object model (ADOM) by identifying duplicate phrases across web pages and removing the duplicate phrases; and
   cleaning the MDOM by removing certain web page data to construct an aggregated document object model (ADOM) by identifying duplicate phrases across web pages and removing the duplicate phrases;
   e) analyzing the attributes of the images and providing each of said images with an aggregate image score;
   f) determining product entities that include properties that define a product, providing each of said product entities with an aggregate quality score, and extracting the product entities from the ADOM;
   g) generating a product list that includes the product entities selected from the ADOM with an aggregate quality score above a pre-determined threshold;
   h) detecting duplicate product data in the product list and post-processing the product list to eliminate the duplicate product data;
   i) performing site link analysis of the product list to determine a location of the product data on a website; and
   j) verifying the accuracy of the product data in the product list by comparing the product data to the web pages.

2. The computer-implemented method of claim 1, further comprising the step of:
   (k) populating a database with the product data from the product list.

3. The computer-implemented method of claim 1, wherein pruning nodes by removing certain nodes from the MDOM comprises the steps of:
   (l) determining leaf nodes in the MDOM, leaf nodes being nodes that are not associated with a child node;
   (m) calculating the frequency of occurrence across the web pages of the leaf nodes; and
   (n) removing from the MDOM the leaf nodes having a frequency of occurrence that exceeds a certain threshold.

4. The computer-implemented method of claim 1, wherein cleaning the MDOM by removing certain web page data comprises the steps of:
   (d1) identifying duplicate phrases across web pages using an entropy-based variance measure that measures the amount of variance in the presence of the phrase across the web pages; and
   (d2) removing the duplicate phrases from the MDOM with an entropy-based variance measure below a certain threshold.

5. The computer-implemented method of claim 1, wherein determining product entities that include properties that define a product, providing each of said product entities with an aggregate quality score, and extracting the product entities from the ADOM comprises the steps of:
   (f1) defining a type of product entity and calculating a product entity quality score from a simple heuristic specific to the type of product entity;
   (f2) calculating a position discount factor based on the position of the content node containing the product entity within a web page and a discount factor;
   (f3) calculating a location score for the product entity from the location of the product entity in the ADOM; and
   (f4) calculating an aggregate quality score for each product entity calculated by:

$$AS=(QS*PDF)^x*(LS)^y$$

wherein AS is the aggregate quality score, QS is the product entity quality score, PDF is the position discount factor, LS is the location score, and x and y are weighting factors.

6. The computer-implemented method of claim 5, wherein the entities required to define a product include a product title, a product image, a product description and a product price.

7. The computer-implemented method of claim 5, wherein calculating a position discount factor is calculated by:

$$PDF=D^{k-1},$$

wherein PDF is the position discount factor, D is a discount value, and k is the number entry for the product entity.

8. The computer-implemented method of claim 5, wherein calculating the location score for the product entity comprises the steps of:
   (d3) defining the location of each product entity as the parent node of the corresponding content node in the ADOM which is a structural node;
   (d4) aggregating all product entity locations based on the unique location identifier of the corresponding structural node;

(d5) calculating the aggregate score for each location as the average of the quality scores of the corresponding entities; and (d6) assigning each product entity a location score based on the aggregate score.

9. The computer-implemented method of claim 1, wherein providing each of said images with an aggregate image score comprises the steps of:

(e1) calculating an image size score from a simple heuristic based on the size of the image;

(e2) calculating a distinctiveness score by:

$$DS=1/(\log_{10}(X)+1),$$

wherein DS is the distinctiveness score, and X is the number of web pages on which the image appears for a website;

(e3) calculating a foreground/background segmentation score by using a statistical region merging (SRM) algorithm; and (e4) calculating an aggregate image score by multiplying the image size score, distinctiveness score and foreground/background segmentation score.

10. The computer-implemented method of claim 1, wherein the step of generating a product list that includes product entities selected from the ADOM with an aggregate quality score above a pre-determined threshold comprises the steps of:

(g1) identifying that a web page includes the entities required to define a product;

(g2) assigning an identified product entity to a product list;

(g3) comparing and selecting product entities with an aggregate quality score above a threshold;

(g4) placing selected product entities in a product list as product data associated with the product; and (g5) calculating an overall product score for the product.

11. The computer-implemented method of claim 10, wherein the overall product score for a product is calculated by:

$$PS=AS_{TITLE}*AS_{IMAGE}*AS_{DESCRIPTION}*AS_{PRICE},$$

wherein PS is the overall product score, $AS_{TITLE}$ is the aggregate score for the product title, $AS_{IMAGE}$ is the aggregate score for the product image, $AS_{DESCRIPTION}$ is the aggregate score for the product description, and $AS_{PRICE}$ is the aggregate score for the product price.

12. The computer-implemented method of claim 1, wherein performing site link analysis of the product list comprises calculating a product link score is calculated by:

$$LS=DH+MIN((PP-1)/R, 1),$$

wherein LS is the product link score, DH is distance the product web page is from the home page of the website, PP is the page position of the product link and R is an average number of products that are featured per web page.

13. The computer-implemented method of claim 12, further comprising the step of modifying the overall product score by dividing the overall product score with the product link score.

14. The computer-implemented method of claim 1, wherein performing site link analysis of the product list is calculated as the inverse of the effective site link distance, and wherein the effective link distance is the distance from a home page plus a MIN value based on link positions.

15. The computer-implemented method of claim 1, wherein verifying the accuracy of the product data in the product list is executed manually.

16. A computer system that extracts content from unstructured sources, the system comprising of:

a website crawling module configured to crawl web pages of a website to extract product data and one or more images associated with the product data, and store the product data and the images on an electronic storage medium;

a parsing module configured to parse the stored product data to generate a standard document object model (SDOM);

a conversion module configured to convert the SDOM into a modified document object model (MDOM) by adding structural nodes that contain web page location data and content nodes that include contiguous segments of web page text data;

a pruning module configured to prune nodes from the MDOM by determining leaf nodes that are not associated with a child node in the MDOM, calculating the frequency of occurrence across the web pages of the leaf nodes, and removing from the MDOM the leaf nodes having a frequency of occurrence that exceeds a certain threshold;

a cleaning module configured to clean the MDOM to construct an aggregated document object model (ADOM) by identifying duplicate phrases across web pages using an entropy-based variance measure that measures the amount of variance in the presence of the phrase across the web pages, and removing the duplicate phrases from the MDOM with an entropy-based variance measure below a certain threshold;

an image analyzing module configured to calculate an image size score from a simple heuristic based on the size of the image, calculate a distinctiveness score by:

$$DS=1/(\log_{10}(X)+1),$$

wherein DS is the distinctiveness score and X is the number of web pages on which the image appears for a website, calculate a foreground/background segmentation score by using a statistical region merging (SRM) algorithm, and calculate an aggregate image score by multiplying the image size score, distinctiveness score and foreground/background segmentation score;

a product entity extraction module configured to define a type of product entity and calculate a product entity quality score from a simple heuristic specific to the type of product entity, calculate a position discount factor by:

$$PDF=D^{k-1}$$

wherein PDF is the position discount factor, D is a discount value, and k is the number entry for the product entity, define the location of each product entity as the parent node of the corresponding content node in the ADOM which is a structural node, aggregate all product entity locations based on the unique location identifier of the corresponding structural node, calculate the aggregate score for each location as the average of the quality scores of the corresponding entities, assign each product entity a location score based on the aggregate score, and calculate an aggregate quality score for each product entity calculated by:

$$AS=(QS*PDF)^x*(LS)^y$$

wherein AS is the aggregate quality score, QS is the product entity quality score, PDF is the position discount factor, LS is the location score, and x and y are weighting factors;

a product list generation module configured to identify that a web page includes the entities required to define a product, assign an identified product entity to a product list, compare and select product entities with an aggregate quality score above a threshold, place selected product entities in a product list as product data associated with the product, and calculate an overall product score for the product by:

$$PS = AS_{TITLE} * AS_{IMAGE} * AS_{DESCRIPTION} * AS_{PRICE},$$

wherein PS is the overall product score, $AS_{TITLE}$ is the aggregate score for the product title, $AS_{IMAGE}$ is the aggregate score for the product image, $AS_{DESCRIPTION}$ is the aggregate score for the product description, and $AS_{PRICE}$ is the aggregate score for the product price;

a duplication and post-processing module configured to detect duplicate product data in the product list and post-process the product list to eliminate the duplicate product data;

a site-link analysis module configured to perform site link analysis of the product list to determine a location of the product data on a website by calculating a product link score calculated by:

$$LS = DH + MIN((PP-1)/R, 1),$$

wherein LS is the product link score, DH is distance the product web page is from the home page of the website, PP is the page position of the product link and R is an average number of products that are featured per web page, and modifying the overall product score by dividing the overall product score with the product link score;

a product data verification module configured to verify the accuracy of the product data in the product list by comparing the product data to the web pages; and a product database module configured to populate a database with the product data from the product list.

* * * * *